(12) United States Patent
Kakiuchi et al.

(10) Patent No.: US 7,061,534 B2
(45) Date of Patent: Jun. 13, 2006

(54) THREE-DIMENSIONAL IMAGE CAPTURING DEVICE

(75) Inventors: Shinichi Kakiuchi, Saitama (JP); Kiyoshi Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 701 days.

(21) Appl. No.: 10/231,125

(22) Filed: Aug. 30, 2002

(65) Prior Publication Data

US 2003/0043287 A1    Mar. 6, 2003

(30) Foreign Application Priority Data

Aug. 31, 2001    (JP) ............................ P2001-263586

(51) Int. Cl.
*H04N 5/222* (2006.01)
*G01C 3/08* (2006.01)

(52) U.S. Cl. ..................... 348/370; 356/5.01
(58) Field of Classification Search ................ 348/370
See application file for complete search history.

(56) References Cited

U.S. PATENT DOCUMENTS

| | | | |
|---|---|---|---|
| 4,687,326 A * | 8/1987 | Corby, Jr. | .................. 356/5.01 |
| 4,893,025 A * | 1/1990 | Lee | ....................... 250/559.33 |
| 6,437,853 B1 | 8/2002 | Seo | |
| 6,542,238 B1 * | 4/2003 | Tsuboi et al. | ............... 356/401 |
| 6,683,676 B1 | 1/2004 | Seo | |
| 6,721,007 B1 | 4/2004 | Tani et al. | |
| 6,734,450 B1 | 5/2004 | Kakiuchi et al. | |
| 6,778,219 B1 | 8/2004 | Seo et al. | |
| 6,812,964 B1 | 11/2004 | Tani et al. | |
| 6,822,681 B1 | 11/2004 | Aoki | |
| 6,822,687 B1 | 11/2004 | Kakiuchi et al. | |
| 6,961,092 B1 | 11/2005 | Kakiuchi et al. | |
| 2002/0149694 A1 | 10/2002 | Seo | |

FOREIGN PATENT DOCUMENTS

| | | |
|---|---|---|
| JP | 2001-116516 | 4/2001 |
| JP | 2002-152777 | 5/2002 |

OTHER PUBLICATIONS

Christie et al., "Design and Development of a Multi-Detecting Two-Dimensional Ranging Sensor", Measurement Science Technology, vol. 6, pp. 1301-1308, 1995.

* cited by examiner

*Primary Examiner*—David Ometz
*Assistant Examiner*—Adam L. Henderson
(74) *Attorney, Agent, or Firm*—Greenblum & Bernstein, P.L.C.

(57) ABSTRACT

A three-dimensional image capturing device has a center LED and peripheral LEDs which are arranged around the center LED. The center LED and peripheral LEDs irradiate distance measuring light beams to a measurement subject. The distance measurement light beams are reflected by a surface of the measurement subject, and the reflected light beams are received by an imaging device, so that distances from the imaging device to the measurement subject are sensed in accordance with the received light amount. The irradiation timings of the center LED and the peripheral LEDs are adjusted, in such a manner that, when the measurement subject is a flat plane parallel to the light receiving surface of the imaging device, the reflected light beams from all of the LEDs are simultaneously received by the imaging device.

13 Claims, 13 Drawing Sheets

THREE-DIMENSIONAL IMAGE CAPTURING DEVICE

BACKGROUND OF THE INVENTION

1. Field of the Invention

The present invention relates to a three-dimensional image capturing device in which the three-dimensional shape of a measurement subject, which is to be measured, is captured by using time-of-flight measurement.

2. Description of the Related Art

Conventionally, there is known a three-dimensional image capturing device, in which distance measuring light beam pulses are radiated from a light emitting diode onto a measurement subject, and the reflected light beam pulses coming from the measurement subject are received by an imaging device such as a CCD, so that the distance from the device to the measurement subject is obtained. The three-dimensional image capturing device may be provided with a plurality of light emitting diodes, to irradiate distance measuring light beam pulses concurrently from the light emitting diodes, so that distance information for the entire photographic area including the measurement subject can be sensed.

However, there are differences in the distances from the plurality of light emitting diodes to the measurement subject, which come from the differences in the positions at which each of the light emitting diodes is disposed. Thus, the distance differences cause errors, which make it difficult to obtain correct distance information. In order to remove these errors, it is necessary for the distance differences to be detected beforehand, and for a correction process to be applied to the sensed distance information. This process may be cumbersome.

SUMMARY OF THE INVENTION

Therefore, an object of the present invention is to provide a three-dimensional image capturing device, in which distance information can be obtained concurrently for a plurality of areas, without generating an error which occurs because of the differences in the positions of the light emitting diodes.

According to the present invention, there is provided a three-dimensional image capturing device, comprising a center light emitting element, a plurality of peripheral light emitting elements, a distance measurement information sensing processor, and a light emission timing adjustment processor.

The center light emitting element irradiates a distance measuring light beam to a predetermined area of a measurement subject, which reflects the distance light beam to generate a first reflected light beam. The plurality of peripheral light emitting elements are disposed around the center light emitting element, and irradiate distance measuring light beams to peripheral areas around the predetermined area, which reflects the distance light beams to generate second reflected light beams. The distance measurement information sensing processor receives the first reflected light beam and the second reflected light beams on a light receiving surface of an imaging device, so that distances from the imaging device to the predetermined area and the peripheral areas are sensed in accordance with the amount of light received by the distance measurement information sensing processor. The light emission timing adjustment processor adjusts the irradiation timings of the center light emitting element and the peripheral light emitting elements, in such a manner that, when the measurement subject is a flat plane parallel to the light receiving surface, the first reflected light beam and the second reflected light beams are simultaneously received by the light receiving surface.

Further, according to the present invention, there is provided a three-dimensional image capturing device, comprising a center light emitting element, a plurality of peripheral light emitting elements, and a distance measurement information sensing processor. The center light emitting element and the peripheral light emitting elements are arranged in such a manner that, when the measurement subject is a flat plane parallel to the light receiving surface, the first reflected light beam and the second reflected light beams are simultaneously received by the light receiving surface.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
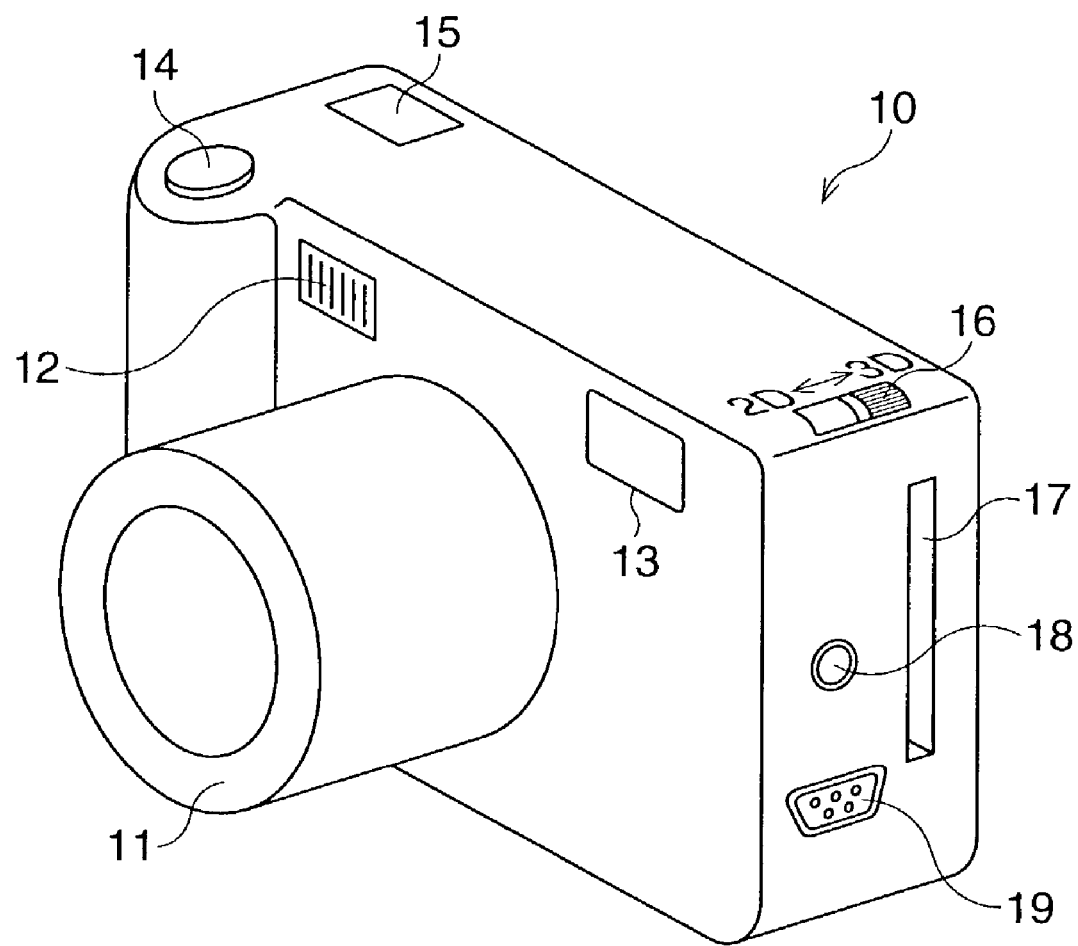
FIG. 1 is a perspective view showing a camera provided with a three-dimensional image capturing device of a first embodiment of the present invention.

The present invention will be described below with reference to the embodiments shown in the drawings.

FIG. 1 is an external view of a camera to which a three-dimensional image capturing device of a first embodiment is applied. The camera is an electronic still camera, which can detect a two-dimensional image (a normal still image) and a three-dimensional image.

On a front surface of a camera body 10, a lens barrel 11 is provided. An electronic flash 12 is disposed toward the left-upper edge, adjacent to the lens barrel 11, and a viewfinder window 13 is provided toward the right-upper edge. On the upper surface of the camera body 10, a release button 14 and a liquid crystal display panel 15 are provided on a left side, and a 2D/3D mode change switch 16 is provided on the right side, when viewed from the front. On a side surface of the camera body 10, a card slot 17 is formed into which a recording medium, such as an IC memory card, is insertable, and a video output terminal 18 and an interface connector 19 are also provided.

Figure 2:
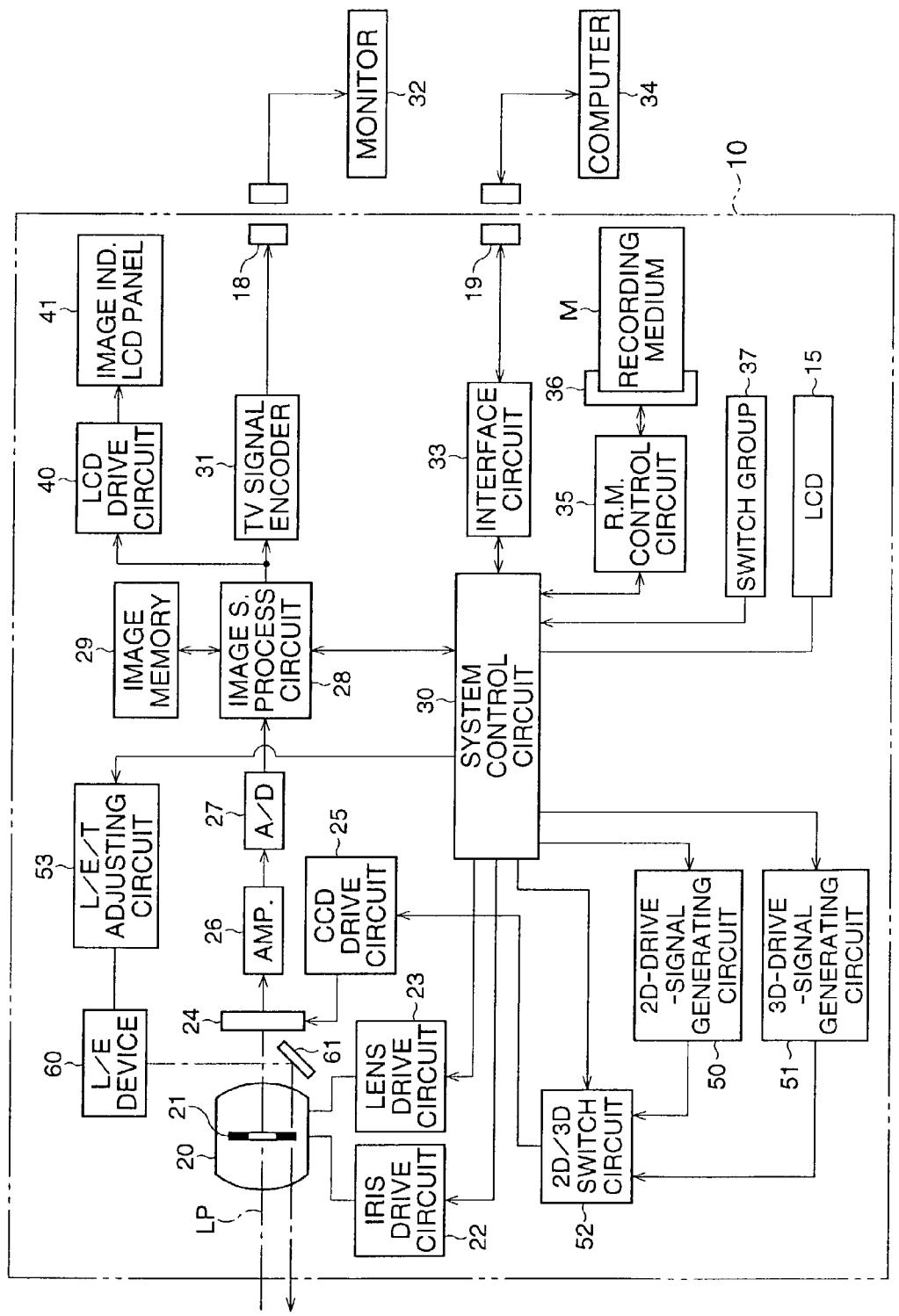
FIG. 2 is a block diagram showing an electrical construction of the camera shown in FIG. 1.

FIG. 2 is a block diagram showing the electrical construction of the camera shown in FIG. 1.

A lens group (i.e., a photographing lens) 20 containing a plurality of lenses is housed in the lens barrel 11 (see FIG. 1). An aperture 21 is provided in the lens group 20. The opening degree of the aperture 21 is adjusted by an iris drive circuit 22. A focusing operation and a zoom operation of the lens group 11 are controlled by a lens drive circuit 23.

An imaging device (CCD) 28 is disposed on an optical axis of the lens group 20. A measurement subject image is formed on a light receiving surface of the CCD 24 through the lens group 20. An electric charge corresponding to the subject image is generated in the CCD 24, and is output as an image signal therefrom. An operation, such as an accumulating operation and a reading operation of the electric charge of the CCD 24, is controlled by a CCD drive circuit 25. The image signal, read from the CCD 24 is amplified by an amplifier 26, and is converted from an analog signal to a digital signal by an A/D converter 27. The digital image signal is subjected to a process, such as a gamma correction, in the image signal process circuit 28, and is stored as digital image data in an image memory 29. The iris drive circuit 22, the lens drive circuit 23, and the image signal process circuit 28 are controlled by a system control circuit 30.

The digital image data are read from the image memory 29, and supplied to an LCD drive circuit 40, which is operated in accordance with the digital image data, so that an image corresponding to the digital image data is indicated on an image indication LCD panel 41.

The digital image data read from the image memory 29 is also transmitted to a TV signal encoder 31, in which the digital image data is converted into a video signal. The video signal is transmitted to a peripheral monitor device 32, provided externally to the camera body 10, through the video output terminal 18, so that an image corresponding to the video signal is indicated in the monitor device 32.

The system control circuit 30 is connected to an interface circuit 33, which in turn is connected to the interface connector 19. Therefore, the digital image data read from the image memory 29 can also be transmitted to a computer 34 connected to the interface connector 19. Further, the system control circuit 30 is connected to an image recording device 36 through a recording medium control circuit 35. Therefore, the digital image data read from the image memory 29 can be recorded in a recording medium M, such as an IC memory card, mounted in the image recording device 36.

A switch group 37, including the release button 14 and the 2D/3D mode change switch 16, and the liquid crystal display panel 15 for indicating the operation mode of the camera, are connected to the system control circuit 30.

A 2D-drive-signal generating circuit 50, a 3D-drive-signal generating circuit 51, and a 2D/3D switch circuit 52 are connected to the system control circuit 30. The 2D-drive-signal generating circuit 50 and the 3D-drive-signal generating circuit 51 generate drive signals, which are transmitted to the CCD drive circuit 25 through the 2D/3D switch circuit 52, so that the CCD is driven based on the drive signals.

Namely, when the 2D/3D mode change switch 16 (see FIG. 1) is set to the 2D-sensing mode, information indicating the 2D-sensing mode is transmitted to the system control circuit 30, so that a command signal is transmitted from the system control circuit 30 to the 2D/3D switch circuit 52. The 2D/3D switch circuit 52 is switched based on the command signal such that a drive signal output from the 2D-drive-signal generating circuit 50 is sent to the CCD drive circuit 25. After that, when the release button 14 is operated to perform a photographing operation, the CCD drive circuit 25 is controlled in accordance with the drive signal output from the 2D-drive-signal generating circuit 50, so that a two-dimensional image is sensed by the CCD 24.

Conversely, when the 2D/3D mode change switch 16 is set to the 3D-sensing mode, the 2D/3D switch circuit 52 is switched based on the command signal such that a drive signal output from the 3D-drive-signal generating circuit 51 is sent to the CCD drive circuit 25. Accordingly, when the photographing operation is performed, the CCD drive circuit 25 is controlled in accordance with the drive signal output from the 3D-drive-signal generating circuit 50, so that distance information is obtained by the CCD 24 according to distance sensing principal described later, and a three-dimensional image is sensed.

A light emission timing adjustment circuit 53 is connected to the system control circuit 30, and a light emission device 60 having a plurality of light emitting elements is connected to the light emission timing adjustment circuit 53. In this embodiment, the light emitting elements are light emitting diodes (LED). Note that the light emitting elements may be laser diodes (LD).

When the 2D/3D mode change switch 16 is set to the 3D-sensing mode, and a photographing operation is performed, pulse signals are transmitted from the system control circuit 30 to the light emission timing adjustment circuit 53. As a result, due to an operation of the light emission timing adjustment circuit 53, a distance measuring light beam is output from each of the LEDs of the light emission device 60 at a predetermined timing based on the pulse signals. The distance measuring light beam irradiated by each of the light emitting elements is reflected by a half-mirror 61, and is led to the measurement subject through the lens group 20. The distance measuring light beam is reflected by a surface of the measurement subject, and the reflected light beam is led into the camera body 10 through the lens group 20. The reflected light beam passes through the half-mirror 61, and is led to the CCD 24.

Figure 3:
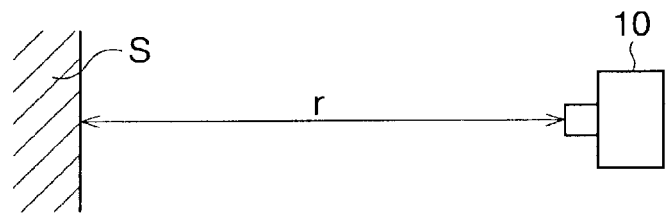
FIG. 3 is a view showing a principle behind a distance measurement.
Figure 4:
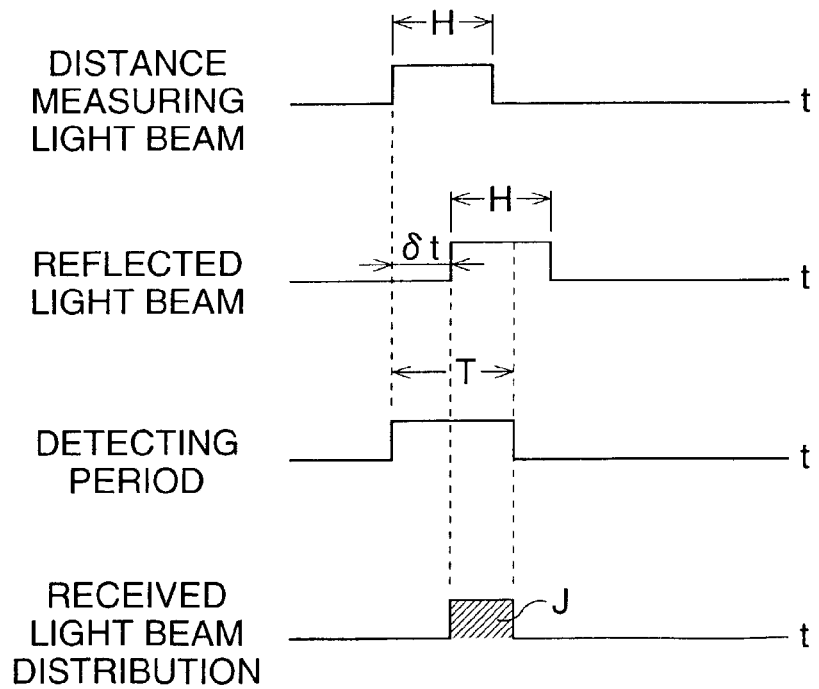
FIG. 4 is a timing chart showing a distance measuring light beam, a reflected light beam, a gate pulse and a distribution of an amount of a light beam received by a CCD.

With reference to FIGS. 3 and 4, the principle behind the distance measurement in the embodiment is described below. Note that, in FIG. 4, the abscissa indicates time "t".

A distance measuring light beam output by each LED of the light emission device 60 is reflected by a measurement subject S, and the reflected light beam is sensed by the CCD 24 (see FIG. 1). The distance measuring light beam is a pulse, the width of which is "H". Accordingly, the reflected light beam is a pulse, the width of which is "H", similar to the distance measuring light beam. The fall of the pulse of the reflected light beam occurs after the fall of the pulse of the distance measuring light beam by a time δ·t (δ is a delay coefficient). Since the distance measuring light beam and the reflected light beam have both traveled a distance "r" between the camera and the measurement subject S, the distance "r" is obtained by the following formula (1):

$$r = \delta \cdot t \cdot C/2 \tag{1}$$

wherein "C" is the velocity of light.

For example, by setting a condition in such a manner that the reflected light beam can only be sensed from a rise of the pulse of the distance measuring light beam to a point prior to a fall of the pulse of the reflected light beam so as to sense a component containing the rise of the pulse of the reflected light beam, i.e., by providing a gate pulse corresponding to a reflected light beam detecting period T, an amount "J" of received light from the reflected light beam becomes a function of the distance "r". Namely, the greater the distance "r" (or the greater the time δ·t), the smaller the received light amount J.

In this embodiment, by taking advantage of the principle described above, the received light amount J is sensed using each of the photo-diodes (photoelectric conversion elements) of the CCD 24, the distance from the camera body 10 to each point on the surface of the measurement subject S is sensed, and data of the three-dimensional image, which indicates a topography of the measurement subject S, can be obtained concurrently.

Figure 5:
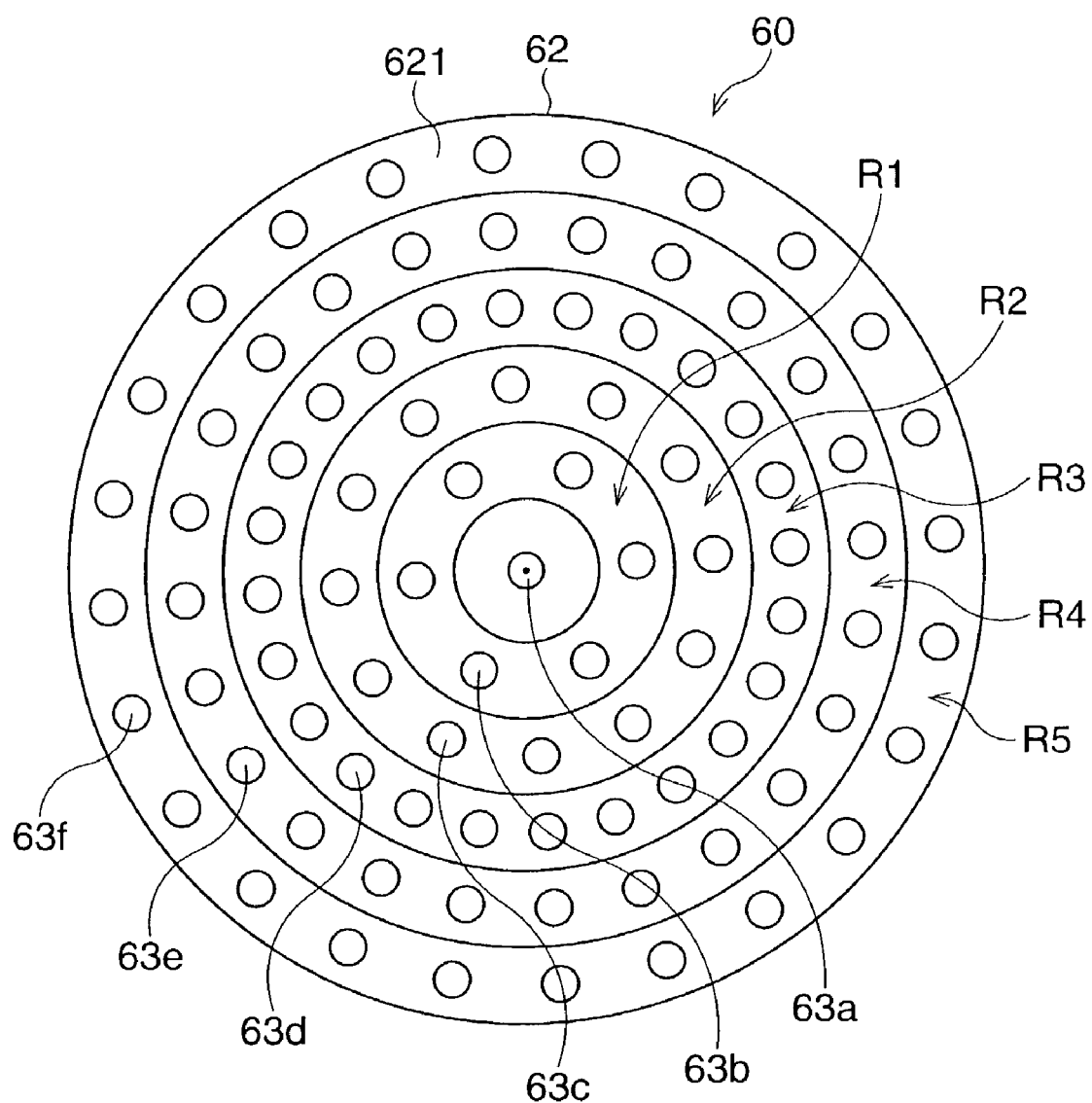
FIG. 5 is a plan view of a light emission device.
Figure 6:
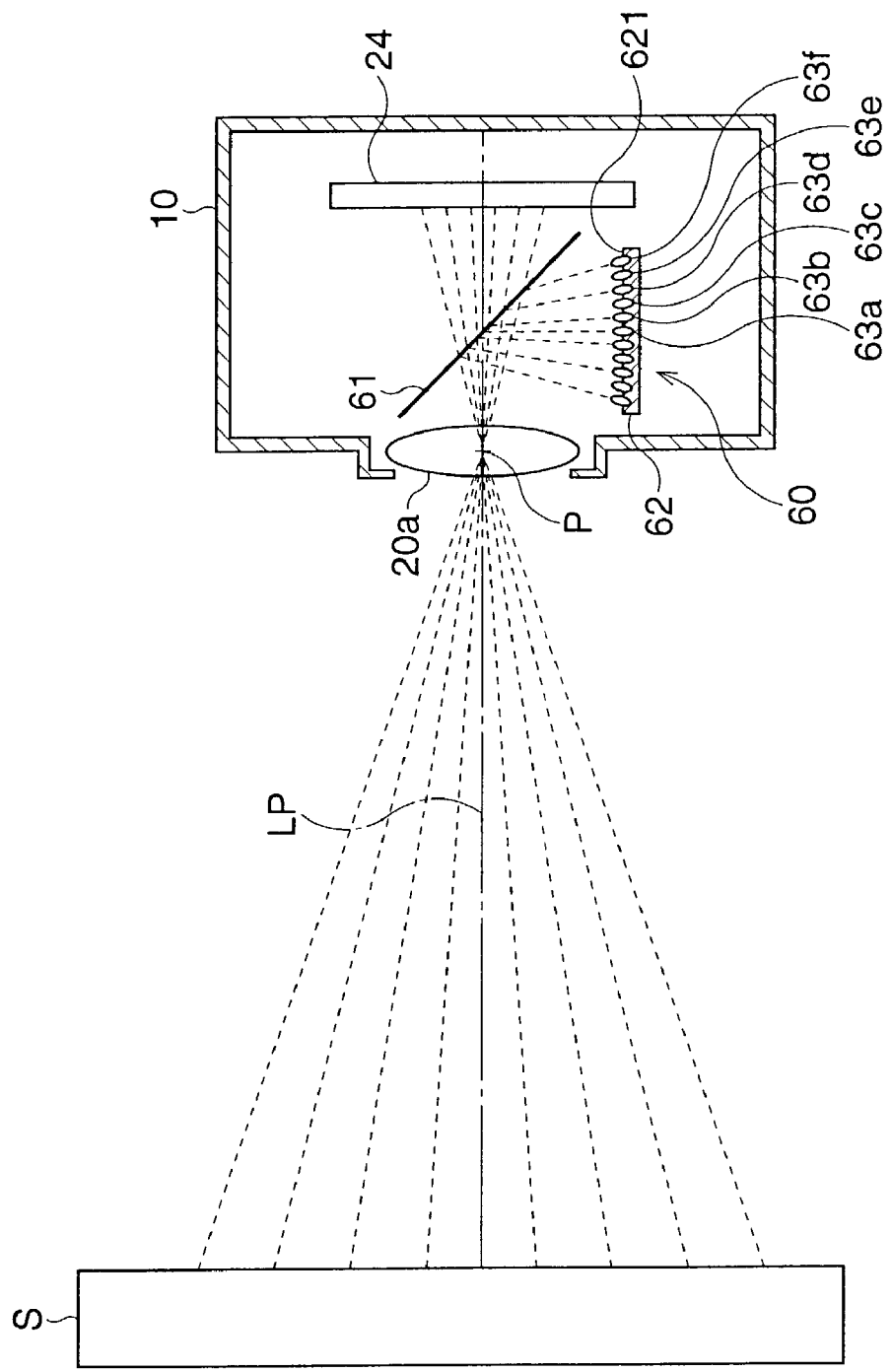
FIG. 6 is a sectional view schematically showing an electronic still camera.
Figure 7:
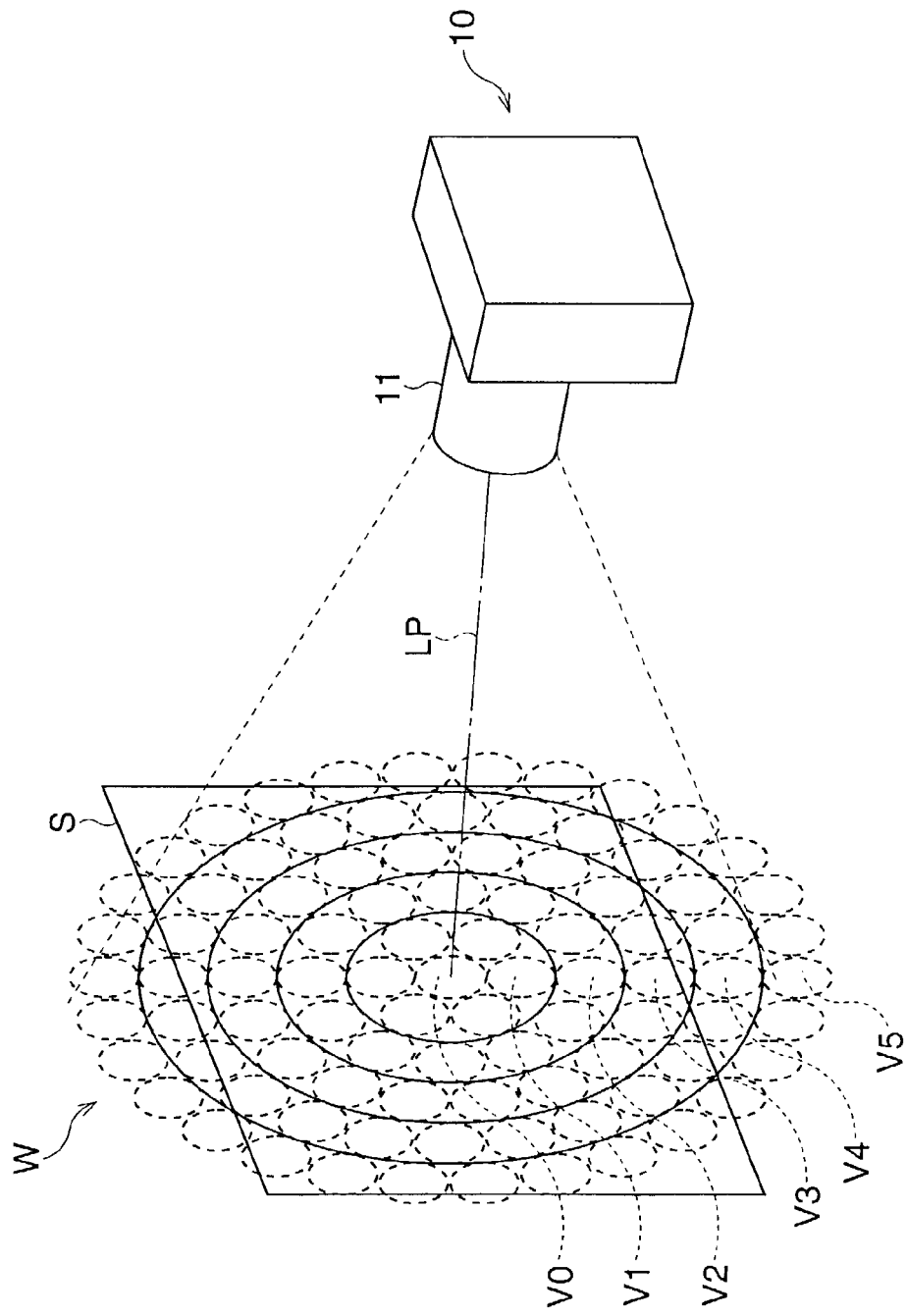
FIG. 7 is a view showing the electronic still camera which is irradiating a distance measuring light beam onto a measurement subject.

With reference to FIGS. 5, 6, and 7, the arrangement of the LEDs of the light emission device 60 is described below. FIG., 5 is a plan view of the light emission device 60, FIG. 6 is a schematic sectional view of the electronic still camera, and FIG. 7 is a view showing the electronic still camera, which is irradiating a distance measuring light beam onto a measurement subject. Note that the number and the arrangement of the LEDs shown in FIGS. 5, 6, and 7 are examples, and the present invention is not limited to this construction.

The light emission device 60 is provided with a base plate 62, having a circular surface 621, on which a plurality of light emitting elements (i.e., LEDs) 63a–63f are disposed. A center light emitting element (i.e., LED) 63a is fixed at the center of the plate surface 621, and the other peripheral LEDs 63b–63f are arranged on five circles, which are coaxial with the center LED 63a.

The peripheral LEDs 63b–63f, arranged on common circles, form groups R1–R5. The first peripheral LEDs 63b, disposed on a circle closest to the center LED 63a, form a first group R1, and the second peripheral LEDs 63c, disposed on a circle outside the LEDs 63b of the first group R1, form a second group R2. Similarly, the third peripheral LEDs 63d, disposed outside the LEDs 63c, form a third group R3, the fourth peripheral LEDs 63e, disposed outside the LEDs 63d, form a fourth group R4, and the fifth peripheral LEDs 63f, disposed outside the LEDs 63e, form a fifth group R5. As described later, the peripheral LEDs 63b–63f belonging to the same group, are inclined by the same angle relative to the plate surface 621, and are controlled at the same timing.

As shown in FIG. 6, the light emission device 60 is housed in the camera body 10. The base plate 62 of the light emission device 60 is disposed in such a manner that the plate surface 621 is parallel to the optical axis LP of the photographing lens 20a. The distance measurement light beams output from the LEDs 63a–63f are irradiated upward in FIG. 6, and are reflected by the half-mirror 61 toward (leftward in FIG. 6) the front surface of the camera body 10. Thus, the distance measurement light beams are converged to the principle point P of the photographing lens 20a, and are led to the measurement subject S.

The LEDs 63a–63f are inclined by different angles depending on each of the groups, so that the distance measurement light beams output from the LEDs 63a–63f hit the measurement subject S at angles which are different from each other and in accordance with the groups R1–R5. The optical axes of the peripheral LEDs 63b–63f are inclined to converge to the optical axis of the center LED 63a in such a manner that the amount of the inclination is greater as the peripheral LEDs 63b–63f are positioned further from the center LED 63a.

Namely, the center LED 63a is disposed approximately vertical to the plate surface 621. Each of the peripheral LEDs 63b of the first group R1 is inclined by 5 degrees in a direction toward the center LED 63a. Each of the peripheral LEDs 63c of the second group R2 is inclined by 10 degrees in a direction of the center LED 63a. Each of the peripheral LEDs 63d of the third group R3, each of the peripheral LEDs 63e of the fourth group R4, and each of the peripheral LEDs 63f of the fifth group R5 are respectively inclined by 15, 20, and 25 degrees in a direction toward the center LED 63a.

As described above, the distance measurement light beams from the LEDs 63a–63f are reflected by the half-mirror 61, and are converged to the principle point P of the photographing lens 20a. The luminous flux of the distance measurement light beam from the center LED 63a is coincident with the optical axis LP. The luminous fluxes of the distance measurement light beams from the peripheral LEDs 63b are inclined to the optical axis LP by 5 degrees. The luminous fluxes of the distance measurement light beams from the peripheral LEDs 63c are inclined to the optical axis LP by 10 degrees. The luminous fluxes of the distance measurement light beams from the peripheral LEDs 63d, 63e, and 63f are inclined to the optical axis LP by 15, 20, and 25 degrees, respectively.

The distance measurement light beams are reflected from the measurement subject S, and the reflected light beams enter the photographing lens 20a and are led to the half-mirror 61. A part of each of the reflected light beams passes through the half-mirror 61, and are led to the light receiving surface of the CCD 24, so that distance information is detected in accordance with the received light amount, based on the distance measurement principle described above.

As shown in FIG. 7, the distance measurement light beams output from the tip end of the lens barrel 11 illuminate a round area W of the measurement subject S. The round area W is composed of a predetermined standard area V0 positioned on the optical axis LP of the photographing lens 20a (see FIG. 6), and peripheral areas V1–V5 positioned on coaxial circles about the standard area V0. Each of the areas V0–V5 does not overlap each other.

The standard area V0 is irradiated by the center LED 63a (see FIG. 6). The peripheral area V1 positioned outside the standard area V0 is irradiated by the peripheral LEDs 63b of the first group R1. The peripheral area V2 positioned outside the peripheral area V1 is irradiated by the peripheral LEDs 63c of the second group R2. The peripheral areas V3, V4, and V5 are respectively irradiated by the peripheral LEDs 63d, 63e, and 63f of the third, fourth, and fifth groups R3, R4, and R5.

The reflected light beams from the standard area V0 and the peripheral areas V1–V5 are received by photodiodes provided on the light receiving surface of the CCD 24, so that the distance information of the measurement subject S is sensed, in accordance with the received light amount, within the round area W which is irradiated by the distance measurement light beams output from the tip end of the lens barrel 11.

Figure 8:
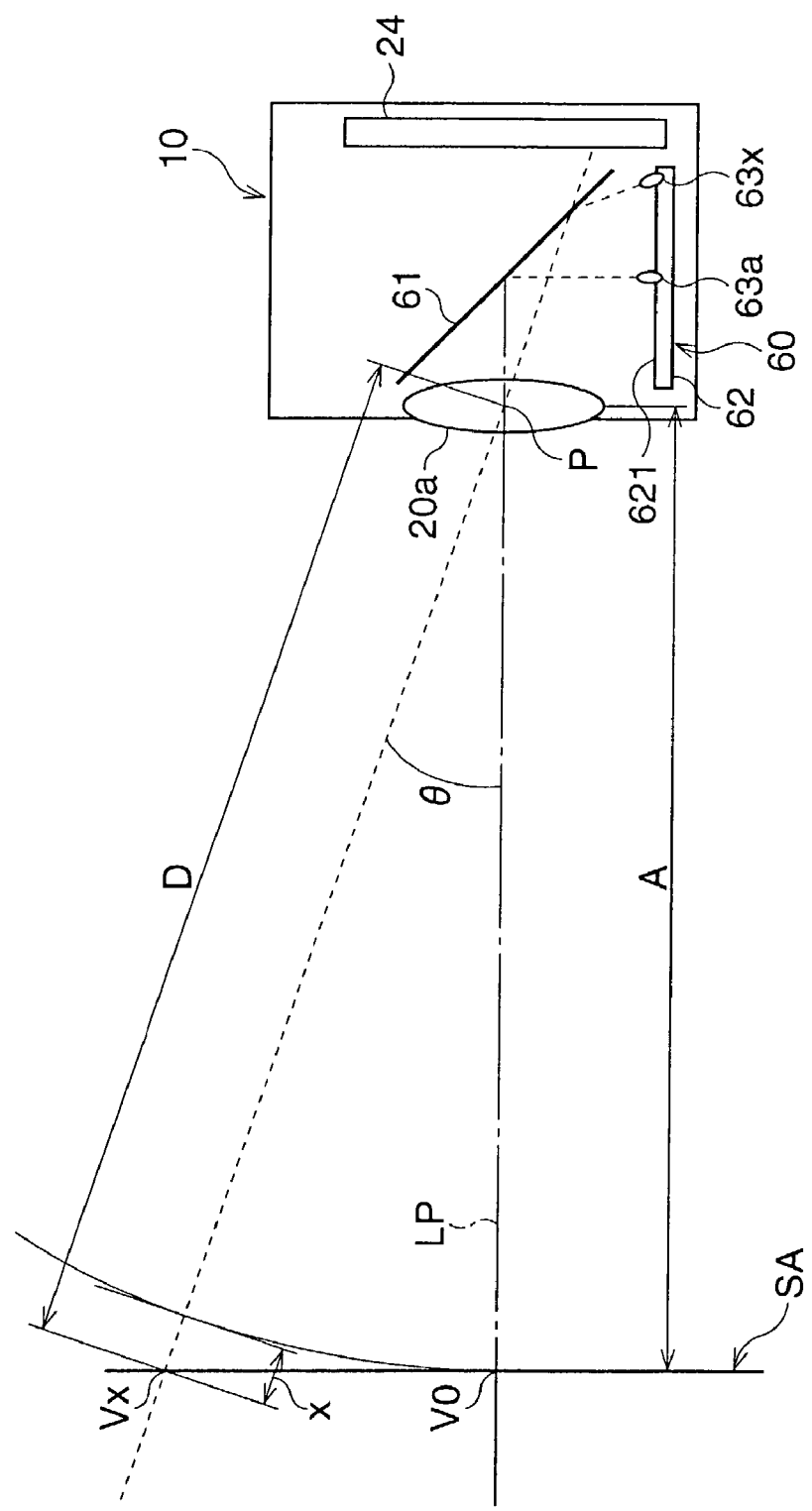
FIG. 8 is a view for explaining the error in the distance information, which is generated due to the dispositions of the LEDs.

With reference to FIG. 8, an error of the distance information, which is generated due to the dispositions of the LEDs 63a–63f, is explained.

When the distance information of, for example, the flat plane SA positioned parallel to the light receiving surface of the CCD 24 is sensed, the flat plane SA is recognized as flat, because the sensed distance information has the same value, regarding all of the areas on the flat plane SA. As described below, however, different distance information is sensed regarding each of the areas on the flat plane SA, because of the dispositions of the LEDs 63a–63f.

As described above, the luminous flux of the distance measurement light beam output by the center LED 63a is coincident with the optical axis LP of the photographing lens 20a, and irradiates the standard area V0 on the flat plane SA. It is supposed that the distance from the principle point P of the photographing lens 20a to the flat plane SA is "A". Further, it is supposed that, when a luminous flux, output from an arbitral peripheral LED 63x included in the peripheral LEDs 63b–63f, is inclined by θ with respect to the optical axis LP of the photographing lens 20a, the distance from the principle point P of the photographing lens 20a to an area Vx on the flat plane SA is "D". Note that the distance from each of the LEDs 63a–63f to the half-mirror 61 and the distance from the half-mirror 61 to the principle point P are roughly identical for each of the LEDs 63a–63f, and are disregarded.

The distance difference X between the distance A, by which the distance measurement light beam output from the center LED 63a proceeds, and the distance D, by which the distance measurement light beam output from the peripheral LED 63x proceeds, is obtained by the following formula (2):

$$X = D - A \\ = (A/\cos\theta) - A \\ = A(1 - \cos\theta)/\cos\theta \quad (2)$$

For example, when the distance A from the flat plane SA to the principle point P is 100 cm, and the peripheral LED 63x is the peripheral LED 63b of the first group R1 (i.e., θ=5 degrees), the value of the distance difference X is approximately 0.40 cm. Namely, when the center LED 63a and the peripheral LEDs 63b of the first group R1 are lit simultaneously, the area V1 irradiated by the peripheral LEDs 63b are sensed as being at a position that is farther by 0.80 cm, in comparison with the area V0 irradiated by the center LED 63a.

Similarly, calculating the distance differences X from the LEDs 63c–63f of the second through fifth groups R2–R5 to the center LED 63a, the distance difference X for the peripheral LEDs 63c of the second group R2 (i.e., θ=10 degrees) is approximately 1.52 cm, the distance difference X for the peripheral LEDs 63d of the third group R3 (i.e., θ=15 degrees) is approximately 3.52 cm, the distance difference X for the peripheral LEDs 63e of the fourth group R4 (i.e., θ=20 degrees) is approximately 6.38 cm, the distance difference X for the peripheral LEDs 63f of the fifth group R5 (i.e., θ=25 degrees) is approximately 10.3 cm. Namely, when the peripheral LEDs 63c–63f, and the center LED 63a are simultaneously lit, the areas V2–V5 irradiated by the peripheral LEDs 63c–63f are sensed as being at a position that is farther by double the distance difference X, so that the flat plane SA is recognized as a convex shape in which the area V0 on the optical axis LP is the most projected area.

If the distance difference X is converted to the time difference Y in which the distance measurement light beam reaches the flat plane SA, the time difference Y is obtained by the following formula (3), since it takes approximately 0.0335 ns for the light beam to proceed by 1 cm.

$$Y = 0.0335 \text{ (ns/cm)} \cdot X \quad (3)$$

In the above example, when the distance A from the flat plane SA to the principle point P is 100 cm, and the peripheral LED 63x is the peripheral LED 63b of the first group R1, the value of the time difference Y is approximately 0.01 ns. Namely, when the center LED 63a and the peripheral LEDs 63b are lit simultaneously, the distance measurement light beam output from the peripheral LEDs 63b reaches the flat plane SA after the distance measurement light beam output from the center LED 63a by approximately 0.01 ns.

Similarly, calculating the time differences Y for the LEDs 63c–63f of the second through fifth groups R2–R5 when compared to the center LED 63a, the time difference Y for the peripheral LEDs 63c of the second group R2 is approximately 0.05 ns, the time difference Y for the peripheral LEDs 63d of the third group R3 is approximately 0.12 ns, the time difference Y for the peripheral LEDs 63e of the fourth group R4 is approximately 0.21 ns, the time difference Y for the peripheral LEDs 63f of the fifth group R5 is approximately 0.35 ns. Namely, when the peripheral LEDs 63c–63f, and the center LED 63a are simultaneously lit, the distance measurement light beams output from the peripheral LEDs 63c–63f reach the peripheral areas V2–V5 after the distance measurement light beam output from the center LED 63a by the corresponding time differences Y.

Thus, the distance measurement light beams output from the peripheral LEDs 63b–63f reach the flat plane SA after the distance measurement light beam output from the center LED 63a by the time difference Y, which depends upon the angle θ. The reflected light beams of the distance measurement light beams, which reach the flat plane SA after that of LED 63A, reach the light receiving surface of the CCD 24 further behind, by the time difference Y. Accordingly, identical distance information is not sensed based on the each area of the flat plane SA, and thus, the flat plane SA is not recognized as a flat surface.

Figure 9:
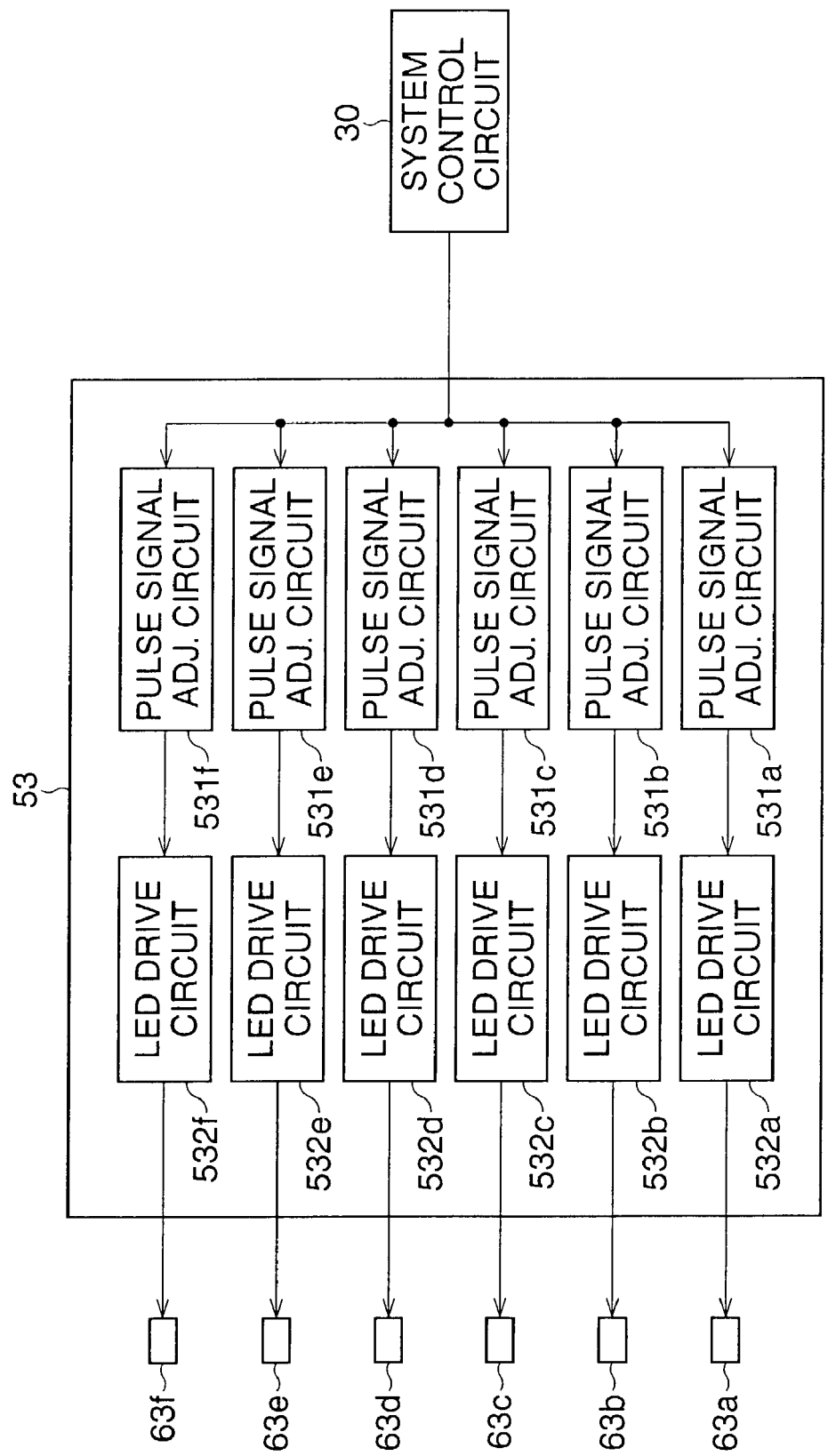
FIG. 9 is a block diagram showing the construction of a light emission timing adjustment circuit.
Figure 10:
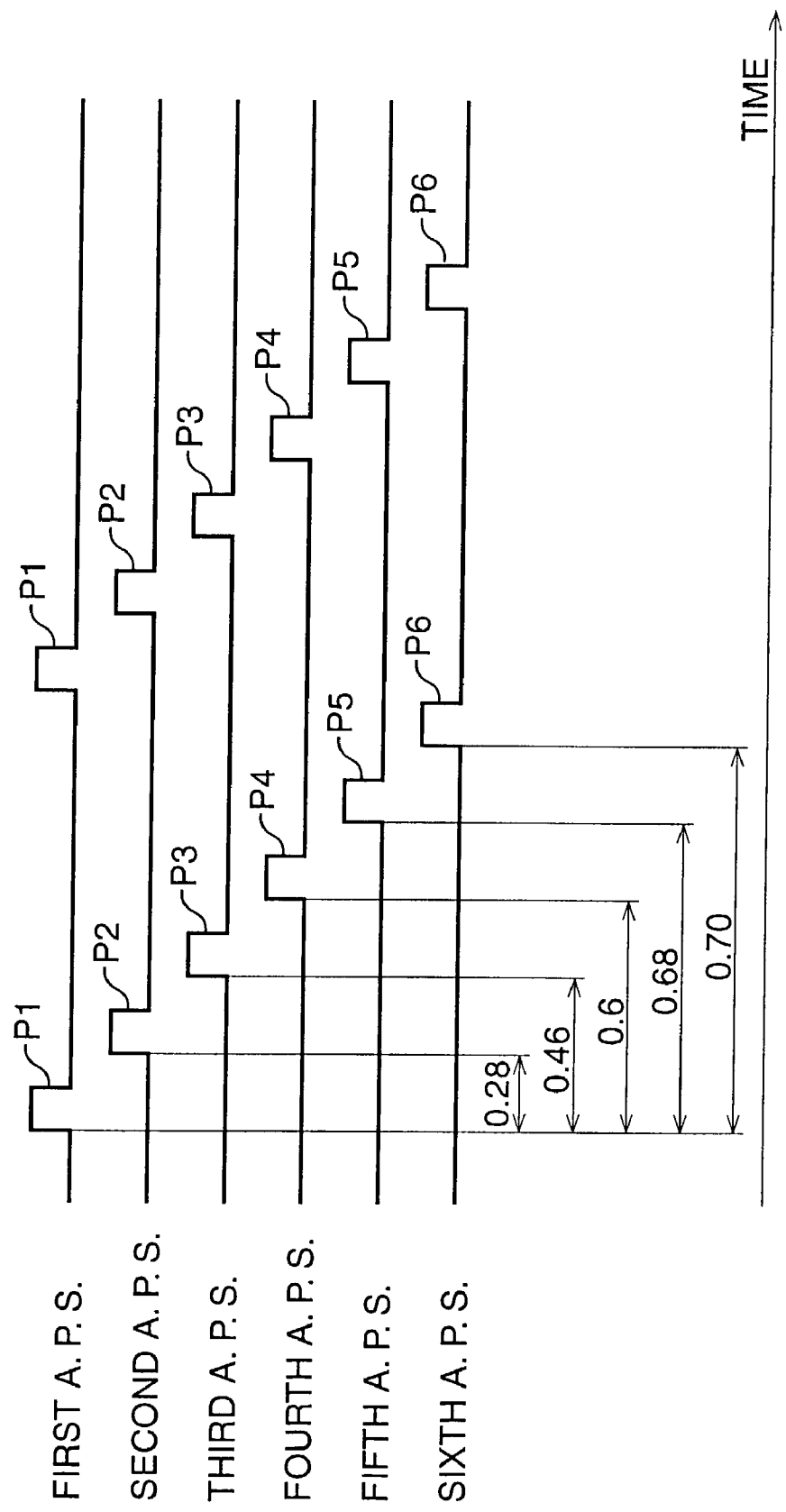
FIG. 10 is a timing chart showing the light emission timing of the LEDs.

In the embodiment, the error of the distance information, generated in accordance with the dispositions of the LEDs 63a–63f, is removed by adjusting the irradiating timing of each of the LEDs 63a–63f. FIG. 9 shows a construction of the light emission timing adjustment circuit 53, and FIG. 10 is a timing chart showing a light emission timing of the LEDs 63a–63f.

The light emission timing adjustment circuit 53 has pulse signal adjustment circuits 531a–531f, and LED drive circuits 532a–532f. The pulse signal adjustment circuit 531a is connected to the center LED 63a through the LED drive circuit 532a. The pulse signal adjustment circuit 531b is connected to the peripheral LEDs 63b of the first group R1 through the LED drive circuit 532b. Similarly, the pulse signal adjustment circuits 531c–531f are connected to the peripheral LEDs 63c–63f of the second through fourth groups R2–R5 through the LED drive circuits 532c–532f.

The pulse signal adjustment circuits 531a–531f adjust the timings of the pulse signals input from the system control circuit 30, to output adjusted pulse signals. The LED drive circuits 532a–532f control each of the LEDs 63a–63f, based on the adjusted pulse signals input from the pulse signal adjustment circuits 531a–531f.

In the 3D-sensing mode, when the release button 14 (see FIG. 1) is operated, a pulse signal is transmitted from the system control circuit 30 to the light emission timing adjustment circuit 53. The pulse signal is input to the pulse signal adjustment circuits 531a–531f, and is subjected to a timing adjustment in each of the pulse signal adjustment circuits 531a–531f in accordance with the time difference Y depending upon each of the dispositions of the LEDs 63a–63f.

As shown in FIG. 10, the adjusted pulse signals are generated by the pulse signal adjustment circuits 531a–531f, on the basis of the light emission timing of the peripheral LEDs 63f positioned at the outermost periphery. Namely, the pulse signal adjustment circuit 531f does not timing-adjust the pulse signal input from the system control circuit 30, to output a first adjusted pulse signal P1. The pulse signal adjustment circuit 531e generates a second adjusted pulse signal P2 which rises at 0.28 ns after the first adjusted pulse signal P1. Similarly, the pulse signal adjustment circuit 531d generates a third adjusted pulse signal P3 which rises at 0.46 ns after the first adjusted pulse signal P1, the pulse signal adjustment circuit 531c generates a fourth adjusted pulse signal P4 which rises at 0.60 ns after the first adjusted pulse signal P1, the pulse signal adjustment circuit 531b generates a fifth adjusted pulse signal P5 which rises at 0.68 ns after the first adjusted pulse signal P1, and the pulse signal adjustment circuit 531a generates a sixth adjusted pulse signal P6 which rises at 0.70 ns after the first adjusted pulse signal P1.

The adjusted pulse signals P1–P6 output from the pulse signal adjustment circuits 531a–531f are transmitted to the LED drive circuits 532a–532f, which make the LEDs 63a–63f irradiate based on the first through sixth adjusted pulse signals P1–P6. The distance measurement light beams, output from the LEDs 63a–63f which irradiate based on the adjusted pulse signals, are reflected by the flat plane SA, and reach the light receiving surface of the CCD 24 simultaneously. Namely, the farther the peripheral LEDs 63b–63f are positioned from the center LED 63a, the earlier the adjusted pulse signal is output in comparison with that of the center LED 63a. Due to this, the time difference Y is removed, so that the identical distance information is sensed, regarding all of the areas on the flat plane SA.

Thus, in the first embodiment, the light emission timing adjustment circuit 53 adjusts the emission timings of the center LED 63a and the peripheral LEDs 63b–63f, in such a manner that, when the measurement subject is a flat plane parallel to the light receiving surface of the CCD 24, a first reflected light beam from the standard area V0 (see FIG. 7) and second reflected light beams from the peripheral areas V1–V5 are simultaneously received by the light receiving surface. Therefore, the flat plane SA parallel to the light receiving surface of the CCD 24 is sensed as a flat plane. Namely, distance information corresponding to the surface shape of the measurement subject is sensed without performing a correction process and so on.

Figure 11:
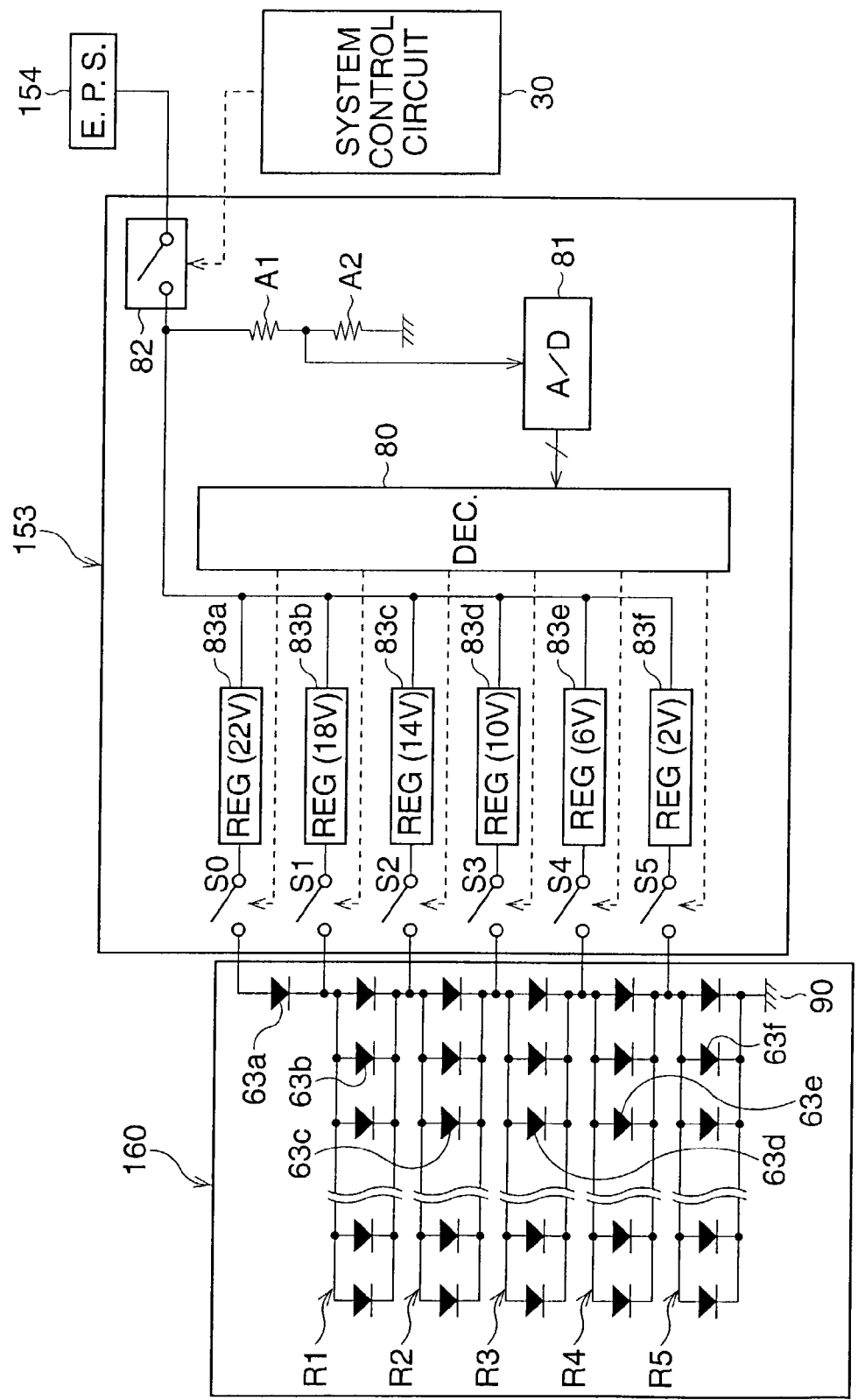
FIG. 11 is a block diagram showing a light emission device and a light emission timing adjustment circuit of a second embodiment.
Figure 12:
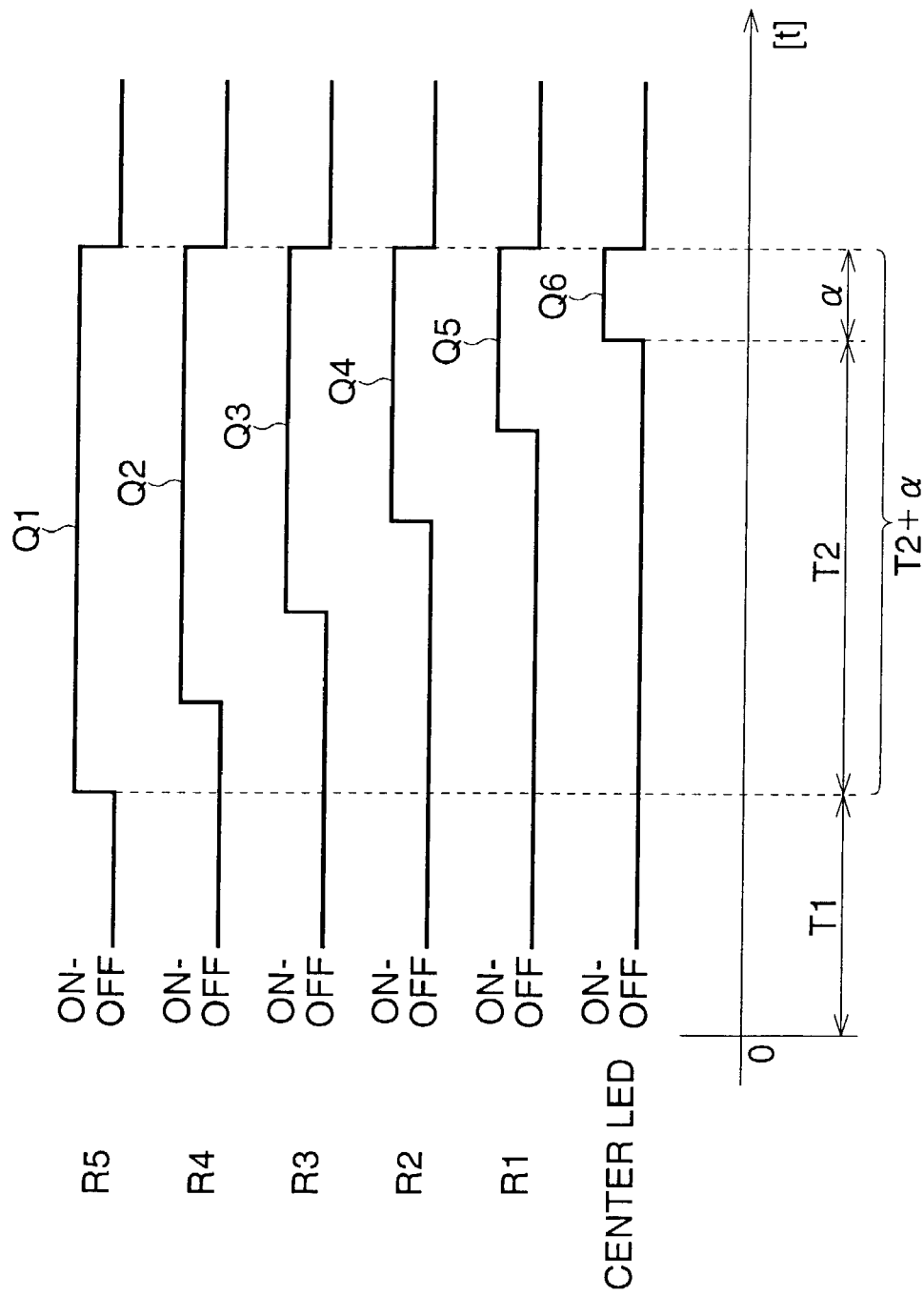
FIG. 12 is a graph showing an operation of LEDs in the second embodiment.
Figure 13:
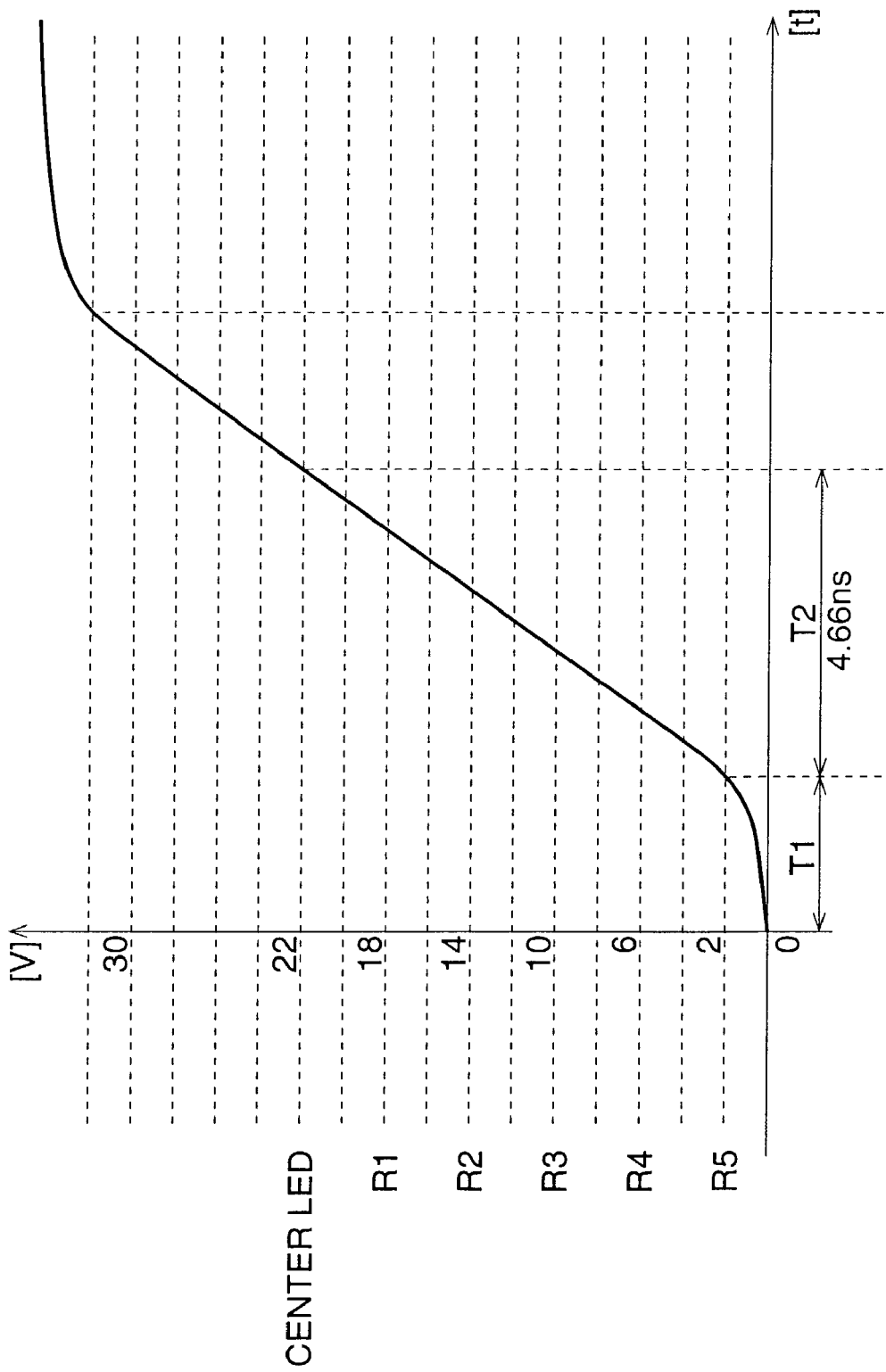
FIG. 13 is a graph showing a change of a voltage output by an electric power source in the second embodiment.

With reference to FIGS. 11, 12, and 13, a second embodiment is described below. In the second embodiment, the light emission timing of an LED is adjusted, taking advantage of the phenomenon in which the electric voltage output by the electric power source is changed or rises immediately after the electric power source is switched ON. FIG. 11 shows the light emission device and the light emission timing adjustment circuit of the second embodiment. Note that elements common to the first embodiment are indicated by the same references.

Similarly to the first embodiment, the light emission device 160 is provided on a base plate 62 with a center LED 63a and peripheral LEDs 63b–63f, and the peripheral LEDs 63b–63f, arranged on the same coaxial circle, form groups R1–R5 (see FIG. 5). As described later, the peripheral LEDs 63b–63f are inclined at predetermined angles.

As shown in FIG. 11, LEDs belonging to the same group are connected in parallel, and the center LED 36a and the groups R1–R5 of peripheral LEDs are connected to each other in series. The peripheral LEDs 63f are grounded. Thus, when an electric voltage is applied to one of the groups R1, R2, R3, R4, or R5, the LEDs belonging to the group are simultaneously lit.

An electric power source 154 is connected to a light emission timing adjusting circuit 153. The electric power source 154 can output 33 volts, for example. The voltage output by the electric power source 154 is input to an electric power source switch circuit 82. The electric power source switch circuit 82 turns ON and OFF the voltage supply of the electric power source 154 in accordance with a switch signal output from the system control circuit 30. When the electric power source switch circuit 82 is turned ON, a voltage output by the electric power source 154 is applied to regulators 83a–83f, and a voltage divider which is composed of dividing resistances A1 and A2.

The regulators 83a–83f adjust an electric voltage output by the electric power source 154 to predetermined voltages, and output the adjusted voltages. The regulator 83a adjusts the voltage to 22 volts, and the regulator 83b adjusts the voltage to 18 volts. The regulators 83c, 83d, 83e, and 83f adjust the voltages to 14 volts, 10 volts, 6 volts, and 2 volts, respectively. The regulators 83a–83f are connected to the LEDs 63a–63f through LED control switch circuits S0–S5.

The dividing resistances A1 and A2 adjust the voltage output by the electric power source 154 to an adjusted voltage which can be applied to an A/D converter 81. The voltage, applied to the dividing resistances A1 and A2, rises as time elapses, immediately after the electric power source switch circuit 82 is turned ON, and due to the rise of the applied voltage, the adjusted voltage obtained by the dividing resistances A1 and A2 rises. In the A/D converter 81, a digital signal is generated in accordance with the adjusted voltage, and is input to a decoder 80.

The decoder 80 makes the LED control switch circuits S0–S5 turn ON and OFF, in accordance with the digital signal. When a time T1 has elapsed after the electric power source 154 is turned ON (see FIG. 13), 2 volts are output by the electric power source 154, so that the decoder 80 makes the switch circuit S5 turn ON in accordance with the digital signal input from the A/D converter 81. As a result, 2 volts are applied to the peripheral LEDs 63f of the fifth group R5 through the switch circuit S5, so that the peripheral LEDs 63f are lit (reference Q1 in FIG. 12).

When 6 volts are output by the electric power source 154, the decoder 80 makes the switch circuit S4 turn ON in accordance with the digital signal. As a result, 6 volts are applied to the peripheral LEDs 63e of the fourth group R4 through the switch circuit S4, so that the peripheral LEDs 63e are lit (reference Q2 in FIG. 12). Note that the peripheral LEDs 63f keep lightening after the peripheral LEDs 63e are lit (reference Q1 in FIG. 12).

Similarly, when 10 volts, 14 volts, 18 volts, and 22 volts are output, the switch circuits S3, S2, S1, and S0 are turned ON, so that the LEDs 63d of the third group R3, the LEDs 63c of the second group R2, the LEDs 63b of the first group R1, and the center LED 63a are lit in this order (references Q3, Q4, Q5, and Q6 in FIG. 12).

When a predetermined time α has passed after the 22 volts were applied to the center LED 63a, the electric power source switch circuit 82 is turned OFF so that all of the LEDs 63a–63f are extinguished.

Thus, in the second embodiment, when the electric power source 154 is actuated, the LED control switch circuits S0–S5 are turned ON to designate the LEDs 63a–63f, to which the electric voltage is to be applied, in accordance with a rise of the electric voltage output by the electric power source 154. Namely, the LED control switch circuits S0–S5 are turned ON in such a manner that the electric voltage is applied first to the peripheral LED 63f, which are disposed at the outer periphery, and is then applied to the peripheral LEDs, which are disposed inward at the outer periphery, in the order of the outermost to innermost peripheral LEDs.

FIG. 13 shows a change in the voltage output by the electric power source 154. The axis of abscissas is time "t", and the axis of coordinates is voltage "V" output by the electric power source 154.

When the electric power source switch circuit 82 (see FIG. 11) is turned ON, 2 volts are output by the electric power source 154 when time T1 has passed. At this time, the peripheral LEDs 63f of the fifth group R5 are lit. It takes a time T2 (i.e., approximately 4.66 ns) for the voltage to reach 22 volts after 2 volts are output from the electric power source 154. Namely, it takes the time T2 from the time when the peripheral LEDs 63f of the group R5 are lit to the time when the center LED 63a is lit. Since the rise of voltage is substantially proportional to the elapse of time for the time T2, the peripheral LEDs of the groups R5 through R1, and the center LED 63a are sequentially lit approximately at every 0.93 ns.

In the second embodiment, the center LED 63a, and the peripheral LEDs 63b–63f are arranged in such a manner that, when the measurement subject is a flat plane SA (see FIG. 8) parallel to the CCD 24, the distance measurement light beams, which are output by the LEDs approximately at every 0.93 ns, are reflected by the flat plane SA, and reach the light receiving surface of the CCD 24 simultaneously.

There is a time difference Y' of approximately 0.93 ns from the irradiation of the LEDs 63b of the first group R1 to the irradiation of the center LED 63a. The distance difference X' between the center LED 63a and the LEDs 63b of the first group R1 is obtained as follows by using the above formula (3).

$$Y' = 0.0670 \text{ (ns/cm)} \cdot X'$$

$$X' = Y'/0.0670 \text{ (ns/cm)}$$

$$X' \approx 27.88 \text{ (cm)}$$

Namely, when the center LED 63a is lit, the distance measurement light beams output from the peripheral LEDs 63b has proceeded by 27.88 cm.

At this time, the distance measurement light beam, output from the peripheral LEDs 63b, proceed with the inclination angle $\theta$ with respect to the optical axis LP, to reach the flat plane SA simultaneously with the distance measurement light beam output from the center LED 63a which proceeds on the optical axis LP. The inclination angle $\theta$ is obtained by using the above formula (2). Note that the distance A', by which the distance measurement light beam output from the center LED 63a proceeds, is supposed to be 1400 cm.

$$X' = A(1 - \cos \theta)/\cos \theta$$

$$27.88 \text{ (cm)} = 1400 (1 - \cos \theta)/\cos \theta$$

$$\cos \theta \approx 0.9805$$

$$\theta \approx 11 \text{ degrees}$$

Similarly, the inclination angles $\theta$ of the groups R2–R4 are calculated, and the angle 74 for the peripheral LEDs 63c of the second group R2 is approximately 16 degrees, for the peripheral LEDs 63d of the third group R3 is approximately 19 degrees, for the peripheral LEDs 63e of the fourth group R4 approximately 22 degrees, and for the peripheral LEDs 63f of the fifth group R5 is approximately 24 degrees. Namely, the peripheral LEDs 63b–63f are inclined and converged to the center LED 63a by the angles $\theta$, and thus, the distance measurement light beams, output from the center LED 63a and the peripheral LEDs 63b–63f, are reflected by the flat plane SA, and reach the light receiving surface of the CCD 24 simultaneously.

As described above, in the second embodiment, since the distance measurement light beams, output by the LEDs 63a–63f which irradiate in accordance with rise of voltage output by the electric power source 154, are reflected by the flat plane SA, and reach the measurement subject simultaneously, accurate distance information can be obtained. Further, according to the second embodiment, since the irradiation timings of the LEDs are adjusted in accordance with the change of voltage output by the electric power source, it is not necessary to provide a specific circuit, which reduces the manufacturing cost of the three-dimensional image capturing device.

Figure 14:
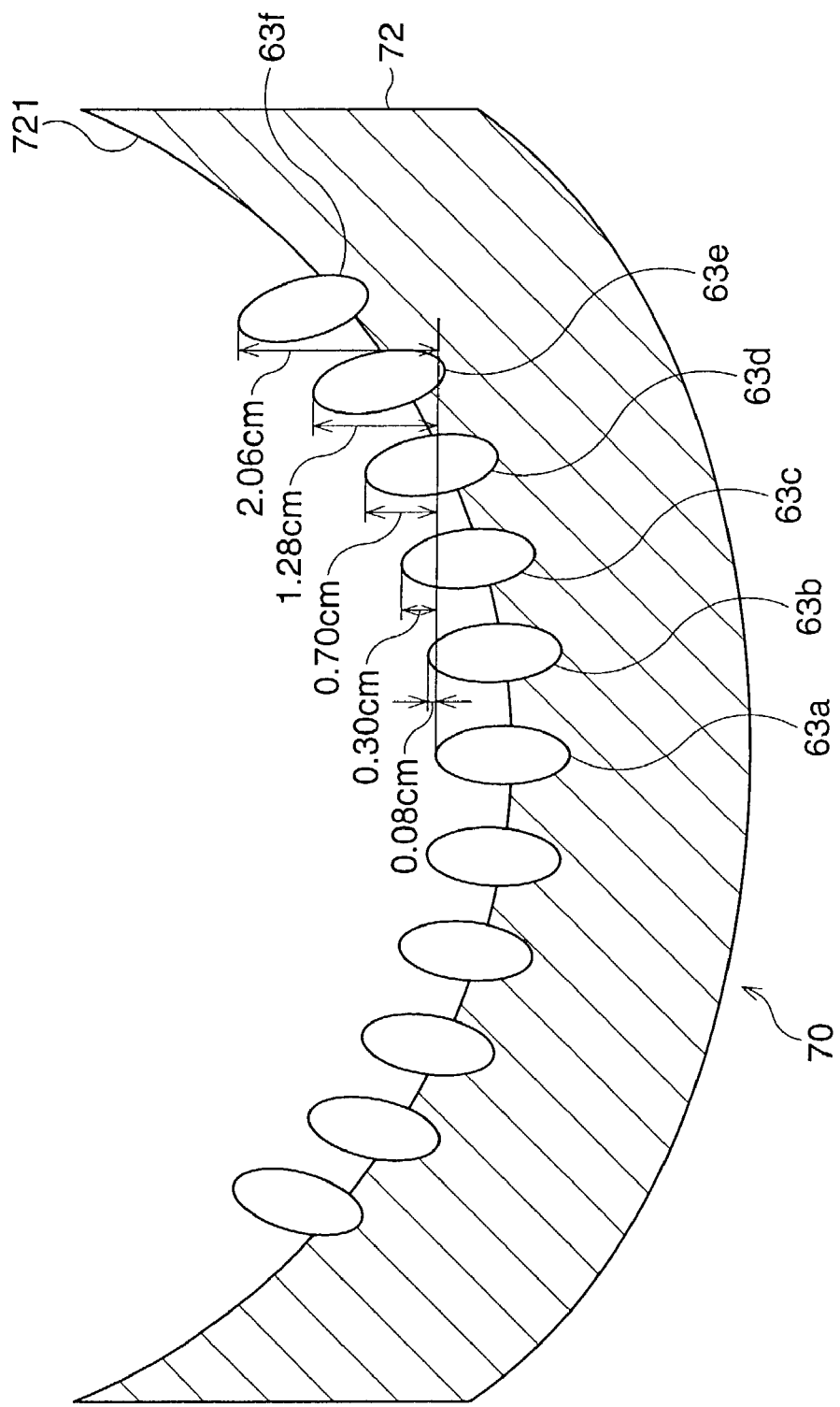
FIG. 14 is a sectional view of a light emission device provided in a third embodiment.

FIG. 14 schematically shows a section of a light emission device 70 provided in a third embodiment, in which the error caused by dispositions of LEDs 63a–63f is removed by changing the shape of a base plate. Note that the structures other than the light emission device 70 are identical with those of the first embodiment.

The light emission device 70 is provided in the camera body 10, similarly to the first embodiment. The light emission device 70 has a base plate 72, which is disk shaped, and the plate surface 721 of the base plate 72 is spherically concave. A center LED 63a is disposed at the center of the plate surface 721, and the peripheral LEDs 63b–63f are arranged in five circles, which are coaxial with the center LED 63a.

In a similar way as that in the first embodiment, the LEDs 63a–63f are arranged so as to incline toward the center of the plate surface 721, so that the luminous flux radiated from the center LED 63a is coincident with the optical axis LP of the photographing lens 20a (see FIG. 1), and the luminous fluxes radiated from the peripheral LEDs 63b–63f are inclined by 5, 10, 15, 20, and 25 degrees with respect to the optical axis LP, respectively.

When obtaining distance information of a flat plane SA, which is positioned at a distance of 10 cm from the principal point P of the photographing lens 20a and which is parallel to the light receiving surface of the CCD 24, an error corresponding to double the distance difference X occurs between the distance A from the principal point P of the photographing lens 20a to the flat plane SA and the distance by which the distance measurement light beams, output from the peripheral LEDs 63x, proceed from the principal point P of the photographing lens 20a to the flat plane SA. The value of double the distance difference X is approximately 0.08 cm in the case of the peripheral LEDs 63b, approximately 0.30 cm in the case of the peripheral LEDs 63c, approximately 0.70 cm in the case of the peripheral LEDs 63d, approximately 1.28 cm in the case of the peripheral LEDs 63e, and approximately 2.06 cm in the case of the peripheral LEDs 63f, which are obtained in a similar way as those in the first embodiment.

In the third embodiment, the center LED 63a and the peripheral LEDs 63b–63f are arranged in such a manner that, when the measurement subject is the flat plane SA, a first reflected light beam, generated on a predetermined area of the flat plane SA reflecting the distance measurement light beam output by the center LED 63a, and second reflected light beams, generated on peripheral areas of the flat plane SA reflecting the distance measurement light beams output by the peripheral LEDs 63b–63f, are simultaneously received by the CCD 24. Thus, the center LED 63a and the peripheral LEDs 63b–63f are arranged in accordance with the distance difference X between a first distance from the center LED 63a to the predetermined area of the flat plane SA and a second distance from the peripheral LEDs 63b–63f to the peripheral areas of the flat plane SA.

Namely, as shown in FIG. 14, the plate surface 721 of the base plate 72 has a section curved corresponding to double the distance difference X, such that the peripheral LEDs 63b–63f are positioned closer to the measurement subject relative to (or in comparison with) the position of the center LED 63a by double the distance difference X.

The distance measurement light beams output by the LEDs 63a–63f are irradiated upward in the camera body 10, and are reflected by the half-mirror 61 to direct them to the measurement subject in a similar way as that in the first embodiment shown in FIG. 6. Namely, the peripheral LEDs 63b–63f are positioned above the LED 63a in the camera body 10 (the LEDs face upwards); i.e., the LEDs 63b–63f are positioned so as to be successively closer to the measurement subject, the LEDs 63f being the closest.

The peripheral LEDs 63b are positioned closer to the measurement subject by approximately 0.08 cm in comparison with the center LED 63a. The peripheral LEDs 63c–63f are positioned closer to the measurement subject by approximately 0.30 cm, 0.70 cm, 1.28 cm, and 2.06 cm, respectively, in comparison with the center LED 63a. Therefore, the distance measurement light beams simultaneously output from the LEDs 63a–63f reach the light receiving surface of the CCD 24 simultaneously. Namely, the error corresponding to double the distance difference X is removed by the dispositions of the LEDs 63a–63f, so that the identical distance information is sensed regarding all of the areas, regarding the flat plane SA.

As described above, according to the third embodiment, distance information corresponding to the shape of the measurement subject is sensed without performing a correction process. Further, since it is not necessary to adjust the irradiation timings of the LEDs 63a–63f as the first embodiment, the construction of the electric circuit is simple.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2001-263586 (filed on Aug. 31, 2001) and No. 2002-240630 (filed on Aug. 21, 2002), which are expressly incorporated herein, by reference, in their entirety.

The invention claimed is:

1. A three-dimensional image capturing device, comprising:
    a center light emitting element that irradiates a distance measuring light beam to a predetermined area of a measurement subject, which reflects said distance light beam to generate a first reflected light beam;
    a plurality of peripheral light emitting elements that are disposed around said center light emitting element, and irradiate distance measuring light beams to peripheral areas around said predetermined area, which reflect said distance light beams to generate second reflected light beams;
    a distance measurement information sensing processor that receives said first reflected light beam and said second reflected light beams on a light receiving surface of an imaging device, so that distances from said imaging device to said predetermined area and said peripheral areas are sensed in accordance with the amount of light received by said distance measurement information sensing processor; and
    a light emission timing adjusting processor that adjusts the irradiation timings of said center light emitting element and said peripheral light emitting elements, in such a manner that, when said measurement subject is a flat plane parallel to said light receiving surface, said first reflected light beam and said second reflected light beams are simultaneously received by said light receiving surface.

2. A three-dimensional image capturing device according to claim 1, wherein said peripheral light emitting elements are arranged in a plurality of circles, which are coaxial with said center light emitting element.

3. A three-dimensional image capturing device according to claim 1, wherein said light emission timing adjusting processor comprises:
    a pulse signal generating processor that generates a pulse signal in accordance with an image capturing operation of said three-dimensional image capturing device;
    a pulse signal adjusting processor that adjusts an output timing of said pulse signal in accordance with the distance difference between a first distance from said center light emitting element to said predetermined area of said flat plane and a second distance from said peripheral light emitting elements to said peripheral areas of said flat plane, to generate an adjusted pulse signal for said center light emitting element and each of said peripheral light emitting elements; and
    a light emitting element driving processor that operates said center light emitting element and said peripheral light emitting elements in accordance with said adjusted pulse signal.

4. A three-dimensional image capturing device according to claim 3, wherein the earlier said adjusted pulse signal is output in comparison with that of said center light emitting element, the farther said peripheral light emitting elements are positioned from said center light emitting element.

5. A three-dimensional image capturing device according to claim 1, further comprising an electric power source that applies electric voltage to said center light emitting element and said peripheral light emitting elements, said light emission timing adjusting processor having a light emitting element control switch that is turned ON to designate said center light emitting element and said peripheral light emitting elements, to which said electric voltage is to be applied, in accordance with a rise of said electric voltage output by said electric power source.

6. A three-dimensional image capturing device according to claim 5, wherein said light emitting element control switch is turned ON in such a manner that said electric voltage is applied first to said peripheral light emitting elements, which are disposed at the outer periphery, and is then applied to said peripheral light emitting elements, which are disposed inward of said outer periphery, in the order of the outermost to innermost peripheral light emitting elements.

7. A three-dimensional image capturing device according to claim 1, wherein the optical axes of said peripheral light emitting elements are inclined to converge to the optical axis of said center light emitting element in such a manner that the amount of the inclination is greater as said peripheral light emitting elements are positioned further from said center light emitting element.

8. A three-dimensional image capturing device according to claim 1, further comprising:
- a camera body that houses said center light emitting element and said peripheral light emitting elements;
- a photographing lens that leads said distance measuring light beam and beams irradiated by said center light emitting element and said peripheral light emitting elements to said measurement subject, and leads said first reflected light beam and said second reflected light beams into said camera body; and
- a half-mirror that reflects said distance measuring light beam and beams to lead the reflected distance measuring light beam and beams to said measurement subject, and passes said first reflected light beam and said second reflected light beams to lead said first reflected light beam and said second reflected light beams to said imaging device.

9. A three-dimensional image capturing device, comprising:
- a center light emitting element that irradiates a distance measuring light beam to a predetermined area of a measurement subject, which reflects said distance light beam to generate a first reflected light beam;
- a plurality of peripheral light emitting elements that are disposed around said center light emitting element, and irradiate distance measuring light beams to peripheral areas around said predetermined area, which reflect said distance light beams to generate second reflected light beams; and
- a distance measurement information sensing processor that receives said first reflected light beam and said second reflected light beams on a light receiving surface of an imaging device, so that distances from said imaging device to said predetermined area and said peripheral areas are sensed in accordance with the amount of light received by said distance measurement information sensing processor;

said center light emitting element and said peripheral light emitting elements being arranged in such a manner that, when said measurement subject is a flat plane parallel to said light receiving surface, said first reflected light beam and said second reflected light beams are simultaneously received by said light receiving surface, said center light emitting element and said peripheral light emitting elements being arranged in accordance with the distance difference between a first distance from said center light emitting element to said predetermined area of said flat plane and a second distance from said peripheral light emitting elements to said peripheral areas of said flat plane.

10. A three-dimensional image capturing device according to claim 9, wherein said peripheral light emitting elements are arranged in a plurality of circles, which are coaxial with said center light emitting element.

11. A three-dimensional image capturing device according to claim 9, wherein said peripheral light emitting elements are positioned closer to said measurement subject relative to said center light emitting element.

12. A three-dimensional image capturing device according to claim 9, wherein the optical axes of said peripheral light emitting elements are inclined to converge to the optical axis of said center light emitting element in such a manner that the amount of the inclination is greater as said peripheral light emitting elements are positioned further from said center light emitting element.

13. A three-dimensional image capturing device according to claim 9, further comprising a base plate that has a curved surface, on which said center light emitting element and said peripheral light emitting elements are arranged.

* * * * *